July 1, 1952  A. TORRESE  2,601,943
HOT BEVERAGE MAKER AND DISPENSER
Filed Jan. 28, 1947  2 SHEETS—SHEET 1

INVENTOR.
Apollo Torrese
BY
Harry Langsam
Attorney

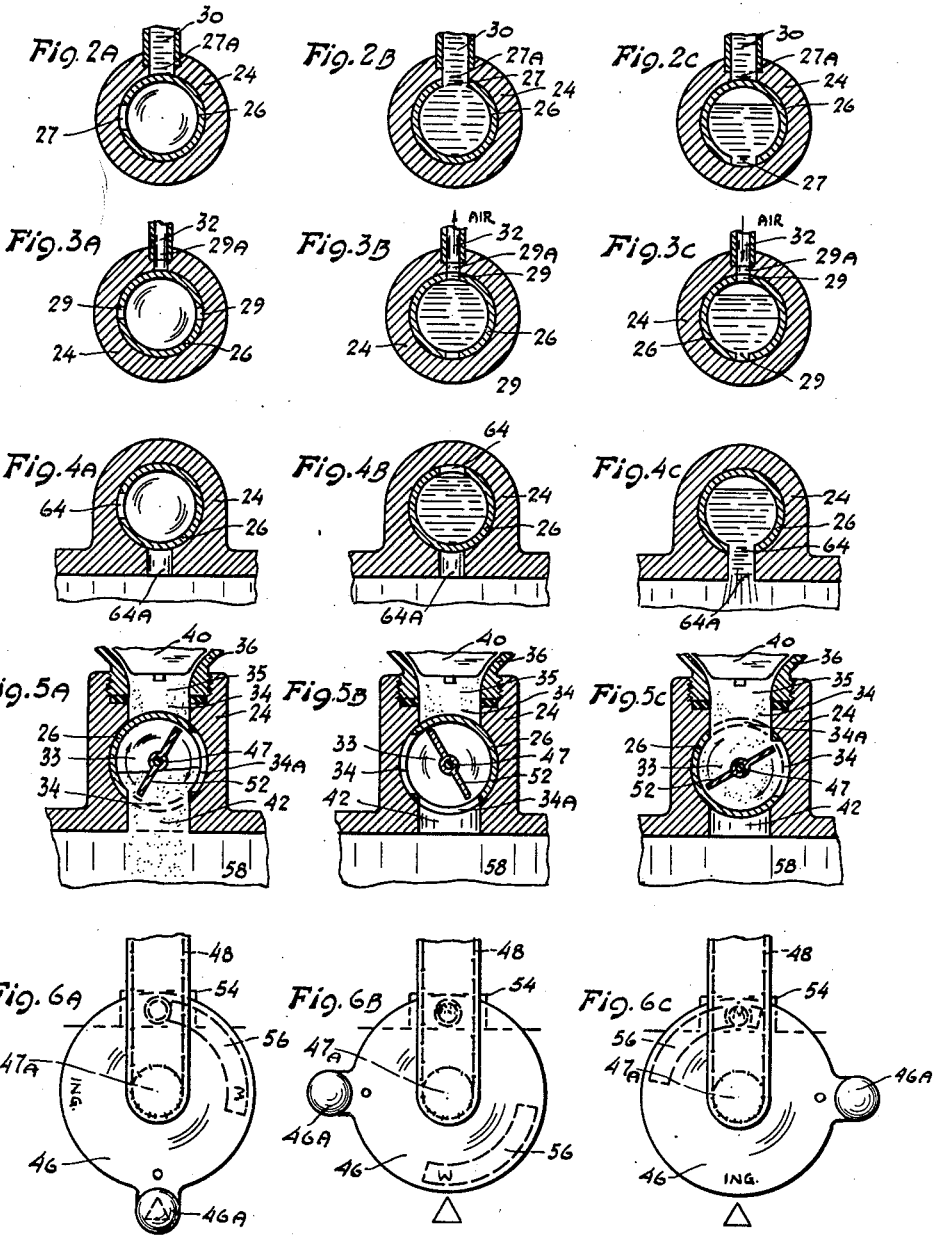

Patented July 1, 1952

2,601,943

UNITED STATES PATENT OFFICE 2,601,943

HOT BEVERAGE MAKER AND DISPENSER

Apollo Torrese, Philadelphia, Pa., assignor of one-third to Peter Altiere and one-third to Lois Altiere, Philadelphia, Pa.

Application January 28, 1947, Serial No. 724,865

1 Claim. (Cl. 225—21)

My invention relates to beverage dispensers and particularly to a dispenser of hot beverages which is adapted for coin control.

Heretofore, it has been difficult to dispense hot beverages, for example, coffee, because the beverage must be freshly prepared as it is used. Otherwise, the heated beverage loses its flavor and becomes bitter on long standing.

An object of my invention is to provide a hot beverage dispenser utilizing completely soluble or suspendible flavoring materials, which dispenser will automatically prepare servings of the beverage as required.

Another object of my invention is to provide a beverage dispenser as described above which can maintain a standby condition for long periods of time without the waste or deterioration of the materials used in the beverage.

Another object of my invention is to provide a beverage dispenser which is especially adapted for coin control, since it may be placed in any desired location, and will operate unattended for long periods of time.

Other objects of my invention are to provide a device of the character described, which is safe and efficient in operation, easy to clean and to service, and of sturdy and inexpensive construction.

With the above and related objects in view, my invention consists in the details of construction and combination of parts, as will be more fully understood from the following description, when read in conjunction with the accompanying drawing in which:

Figs. 2a, 2b and 2c are views along the lines 2—2 of Fig. 1, taken at different points of the operating cycle.

Figure 1:
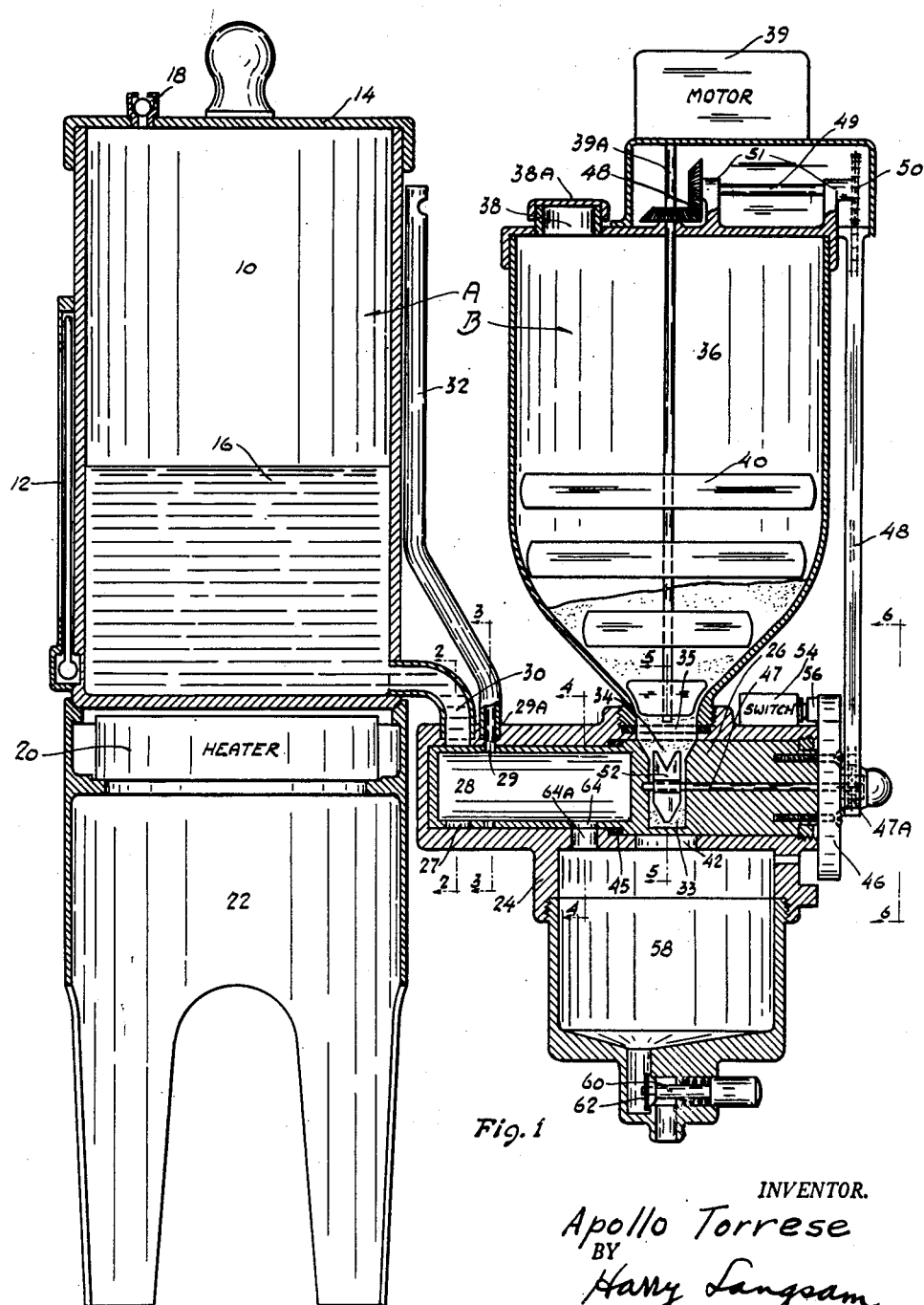
Fig. 1 is a sectional side elevation of an embodiment of my invention.

Figs. 3a, 3b and 3c are views along the lines 3—3 of Fig. 1, taken at points of the operating cycle corresponding to Figs. 2a, 2b and 2c respectively.

Figs. 4a, 4b and 4c are views along the lines 4—4 of Fig. 1, taken at points of the operating cycle corresponding to Figs. 2a, 2b and 2c respectively.

Figs. 5a, 5b and 5c are views taken along the lines 5—5 of Fig. 1, taken at points of the operating cycle corresponding to Figs. 2a, 2b and 2c respectively.

Figs. 6a, 6b and 6c are views taken along the lines 6—6 of Fig. 1, taken at points of the operating cycle corresponding to Figs. 2a, 2b and 2c respectively.

Referring now to the drawings, wherein similar reference characters refer to similar parts, I show a hot beverage dispenser consisting of a water heater assembly, generally designated as A, and a mixer assembly, generally designated as B. The water heater assembly A comprises an insulated boiler or tank 10 equipped with a thermostat 12. The boiler has a removable cover 14 permitting the periodic replenishment of the water supply 16. A safety valve 18 is embodied in the cover. The boiler is heated by an electrical resistance heating coil 20 which operates in conjunction with the thermostat to maintain the water in the boiler at a temperature just below the boiling point. The whole heating assembly is supported on a stand 22.

The mixing assembly B consists of a housing 24 having a generally cylindrical interior. A close fitting cylindrical member 26 is revolvable therein. The member 26 has two hollow chambers, 28 and 33, for the purpose of receiving measured quantities of hot water and beverage powder respectively. The hot water chamber 28, which is located at one end of member 24, has a water inlet port 27, and a pair of diametrically opposed air ports 29, in its walls. Similar ports, 27A and 29A, are located at corresponding points in the housing 24. A duct 30 connects the water inlet port 27A in the housing, with the boiler tank as shown in Fig. 1. An open tube 32 connects to the housing port 29A and serves as an air vent when the chamber 28 is being filled with water or emptied. The chamber 33 which receives the beverage powder is located about midway along the cylinder, and a circumferential section 34 of the chamber wall is removed. An inlet 35 is provided in the housing, above the powder chamber 33, and supports an inverted powder receptacle 36. A packing ring 45 serves to prevent water from leaking around the cylinder 26 into the powder chamber 33. The upper end of the powder receptacle has a filler opening 38 and cap 38A, and supports an electric motor 39 together with its drive assembly. The motor shaft 39A projects axially through the receptacle and is provided with paddles 40 which agitate the powder 41, therein, so as to keep the powder freely-flowing.

An operating wheel and handle 46 is bolted to the free end of the cylinder 26. A revolvable shaft 47 extends axially through the cylinder 26 and revolves independently of cylinder 26, one end being journalled in the wall separating the chambers 28 and 33, while the other end projects through the center of cylinder member 26 and wheel 46 and terminates in a pulley 47A. A belt 48 rotates the pulley, being in turn rotated by the motor shaft 39A through a pair of bevel gears 48, the shaft 49 and the pulley 50, which are supported in bearings 51 located on the upper end of the powder receptacle. A paddle 52 keyed to shaft 47 is adapted to assist in filling the chamber 33 with powder through inlet port 35, and to evacuate the powder through outlet port 42, in the housing below. An electric switch 54 in circuit with the motor is located on the housing 24 adjacent to the operating wheel 46. An arcuate cam or projection 56 is attached to the inner side of the wheel 46 so that when the projection 56 engages the switch the motor circuit is closed. At the other positions of the operating handle the switch 54 is electrically open and the motor is inoperative.

A mingling chamber 58 is attached to the housing below the powder chamber 33. The chamber 58 has a bottom which slopes downwardly to the center and an outlet port 60 equipped with a dispensing valve 62 of customary construction.

A port 64 is located in the water chamber 28 near its inner end and when this port registers with a corresponding port 64A in the housing 24, which communicates with the mingling chamber, the hot water in chamber 28 drains into the mingling chamber 58. The operating wheel 46 may be provided with a ratchet edge and a pawl (not shown) so that the wheel can only rotate clockwise.

The operation of my invention is described as follows:

In the "O" or off position of the operating handle 46, as shown in Figs. 2a, 3a, 4a, and 5a, the water inlet port 27 is out of register with the housing port 27A and consequently no water can flow into the empty measuring chamber 28 from the boiler. The air escape port 29 and the water escape port 64 are also out of register with their housing ports 29A and 64A respectively. The powder chamber is empty and the motor is inoperative. Upon the insertion of a coin in a coin lock (not shown) the operating wheel 46 is made free to rotate in a clockwise direction. The wheel is turned to the "W" or water position illustrated in Fig. 2b by the operator. Simultaneously, the water chamber 28 is filled from the boiler through the duct 30 and the ports 28 and 28A, which are now in register. Likewise, a port 29 and the housing port 29A are in register so that the air contained in the chamber 28 can escape.

The wheel 46 is then turned to the "ING" or ingredient position of Fig. 6c. Now the water inlet port 28 is closed, and the air port 29 remains open to permit the hot water in chamber 28 to drain thru the outlet port 64 and 64A into the mingling chamber 58. Meanwhile, the electric motor has been started as previously described and the powder chamber 33 has been recharged, as shown in Fig. 5c. When the operating handle is turned past the "ING" position, the beverage powder is evacuated into the mixing chamber 58 below. The hot water immediately dissolves the beverage powder and may be tapped off thru the dispensing valve 62.

Although my invention has been described in considerable detail, such description is intended as being illustrative rather than limiting, since the invention may be variously embodied, and the scope of the invention is to be determined as claimed.

I claim as my invention:

In combination, a container for beverage powder, a hot water heater and a beverage dispenser including a mixing chamber, means in said dispenser for delivering measured quantities of hot water and of beverage powder respectively to said mixing chamber, said means comprising a housing with a cylindrical bore, inlet and outlet ports in said housing, a chambered cylinder revolvable within said housing, and inlet and outlet ports in said cylinder arranged to register successively with the inlet and outlet ports respectively in said housing, an electric motor, a paddle within said beverage powder, a beverage powder chamber within the chambered cylinder for receiving a predetermined quantity of beverage powder, and a paddle within said beverage powder chamber to positively dispense the beverage powder into the mixing chamber, and means actuated by said motor to actuate said paddles.

APOLLO TORRESE.

REFERENCES CITED

The following references are of record in the file of this patent:

UNITED STATES PATENTS

| Number | Name | Date |
|---|---|---|
| 474,343 | Oakley | May 3, 1892 |
| 874,757 | Fox | Dec. 24, 1907 |
| 1,804,795 | Lee | May 12, 1931 |
| 2,149,270 | Burgess | Mar. 7, 1939 |
| 2,387,871 | Baumann | Oct. 30, 1945 |

FOREIGN PATENTS

| Number | Country | Date |
|---|---|---|
| 24,319 | Great Britain | July 20, 1893 |
| 558,593 | France | May 28, 1923 |